United States Patent

Felske

[11] Patent Number: 5,570,496
[45] Date of Patent: Nov. 5, 1996

[54] HOSE COUPLING INSERTION METHOD

[76] Inventor: R. E. Joe Felske, 1319 Woodland La., LeClaire, Iowa 52753

[21] Appl. No.: 385,753

[22] Filed: Feb. 8, 1995

[51] Int. Cl.$^6$ .................................................. B23P 11/02
[52] U.S. Cl. ........................... 29/450; 29/456; 403/370; 403/371; 285/33; 285/239
[58] Field of Search ..................... 29/450, 456; 403/370, 403/371; 285/238, 239, 33

[56] References Cited

U.S. PATENT DOCUMENTS

| | | | |
|---|---|---|---|
| 2,257,321 | 9/1941 | Arnold | 285/33 |
| 2,279,508 | 4/1942 | Bergan | 403/370 |
| 3,163,450 | 12/1964 | Eirhart, Jr. | 285/238 |
| 3,175,455 | 3/1965 | Reddy | 403/370 |
| 3,182,986 | 5/1965 | Brockman | 403/370 |
| 3,561,798 | 2/1971 | Redfern | 403/370 |
| 3,584,473 | 6/1971 | MacDonald | 403/370 |
| 3,750,519 | 8/1973 | Lerich | 85/77 |
| 3,847,495 | 11/1974 | Peter et al. | 403/370 |
| 4,082,318 | 4/1978 | Mueller, Jr. | 29/450 |
| 4,095,908 | 6/1978 | Schäfer et al. | 403/370 |
| 4,314,784 | 2/1982 | Tausig | 411/57 |
| 5,064,227 | 11/1991 | Spors et al. | 285/239 |
| 5,135,268 | 8/1992 | McNaughton et al. | 285/239 |
| 5,154,558 | 10/1992 | McCallion | 403/371 |
| 5,261,709 | 11/1993 | McNaughton et al. | 285/239 |

FOREIGN PATENT DOCUMENTS

| | | | |
|---|---|---|---|
| 3443757 | 6/1986 | Germany | 403/370 |
| 94242 | 7/1959 | Norway | 403/370 |

Primary Examiner—S. Thomas Hughes
Assistant Examiner—Marc W. Butler
Attorney, Agent, or Firm—Rockey, Rifkin & Ryther

[57] ABSTRACT

The present invention teaches a simple and convenient hose end expansion device which slides within the hose end and is then quickly expanded by means of mechanical or hydraulic pressure, thereby stretching the hose end to a larger diameter. The device is then quickly collapsed and removed from the hose end, and a barbed coupling is inserted within the hose before it has sufficient time to return to its original diameter. As the hose returns to its original diameter, the hose coupling becomes secured within the hose end. External hose clamps may be added for increased security and safety.

4 Claims, 1 Drawing Sheet

HOSE COUPLING INSERTION METHOD

BACKGROUND OF THE INVENTION

1) Field of the Invention

This invention relates to the field of water and material handling hoses and couplings, and more particularly to a device which expands the end of such hoses to allow the insertion of hose coupling devices.

2) Related Art

It is often necessary to couple hoses together in order to transport water or other material between two points. This typically requires the use of couplings which must first be secured to the hose ends. Various type of couplings are available which generally are positioned within the inside diameter of the ends of the hose and then secured therein by the use of external bands which squeeze the hose on the coupling. The couplings are commonly formed with hose barbs around their exterior which help insure a secure fit. Various devices are available to force the coupling within the hose end. One such device uses a threaded mandrel which is placed within the hose and is then secured therein with a vice squeezing upon the exterior of the hose adjacent the mandrel. A coupling is then forced within the hose by means of a threaded drive plate which is screwed onto the mandrel. Another common system utilizes powerful hydraulic rams to insert the couplings into the hose ends.

BRIEF SUMMARY OF THE INVENTION

The present invention teaches a simple and convenient hose end expansion device which slides within the hose end and is then expanded by means of mechanical or hydraulic pressure, there by stretching the flexible hose end to a larger diameter. The device is then quickly collapsed and removed from the hose end, and a barbed coupling is inserted within the hose before it has sufficient time to return to its original diameter. As the hose returns to its original diameter, the hose coupling becomes secured within the hose end. External hose clamps may be added for increased security and safety.

DESCRIPTION OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
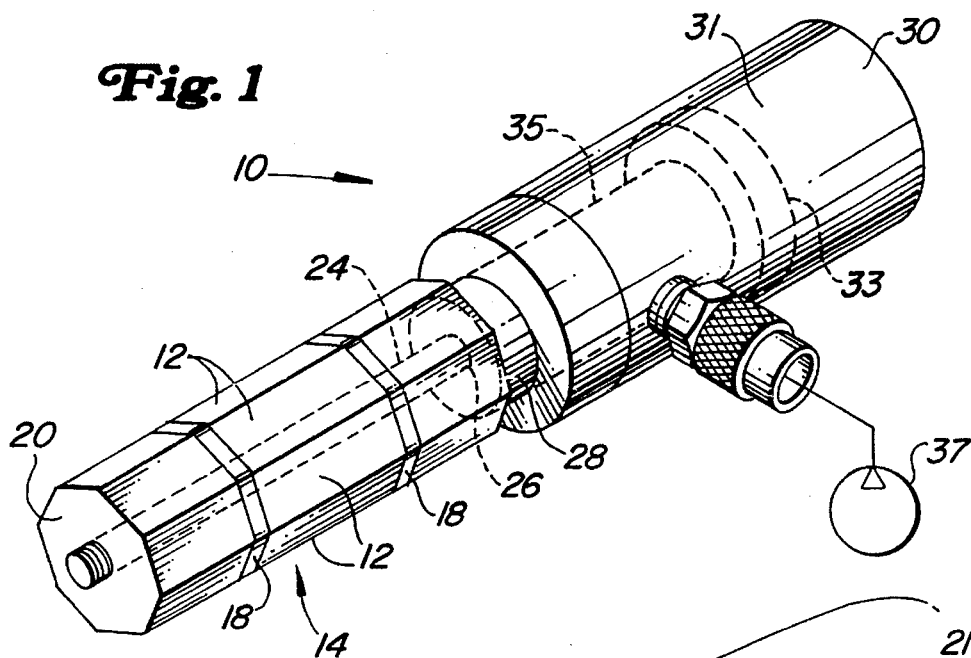
FIG. 1 is a perspective view of a preferred embodiment of the invention.
Figure 2:
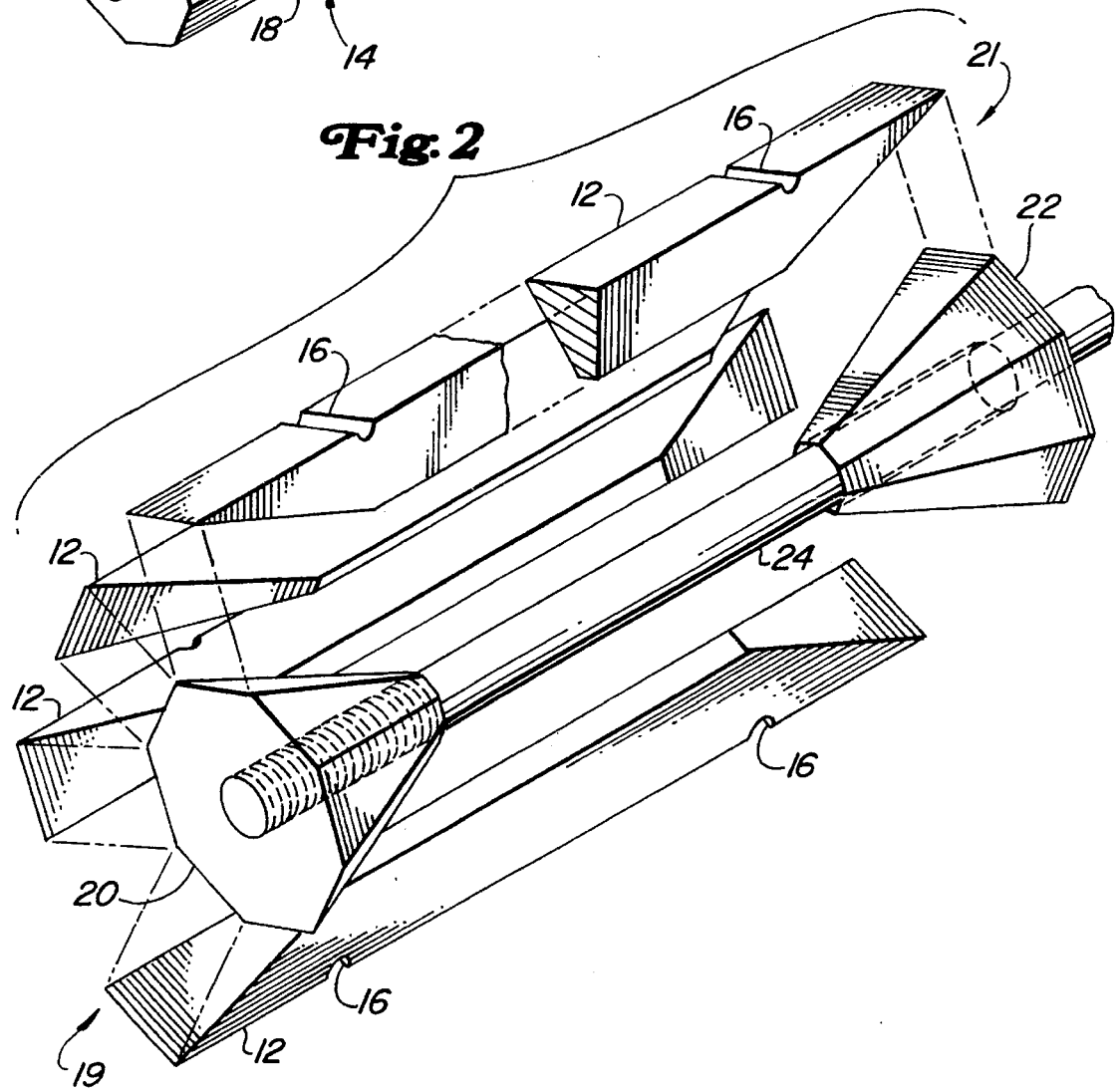
FIG. 2 is an exploded view of the preferred embodiment.

Referring now to the drawings, wherein like reference numerals designate identical or corresponding parts throughout the several views, the expansion mechanism 10 according to the present invention is shown in perspective in FIG. 1 and is exploded in FIG. 2. A series of eight wedge-like members 12 are fitted together to form an elongate octagonal structure 14. Each end of the wedge-like member 12 has been truncated from base to apex at approximately a 30 degree angle, and the apex of each member has been removed such that an aperture is formed within the octagonal structure when the members are fitted together, and each end is concave. Each wedge-like member 12 has a pair of slots 26 cut across its base within which is fitted an elastic band 18 when the elongate octagonal structure is formed. These elastic bands 18 hold the structure to it smallest diameter for subsequent placement within the hose as is described below. Within each concave end 19 and 21 is fitted and octagonal frustum 20 and 22, one of which 20 is threaded and one of which 22 is unthreaded. In the preferred embodiment, a rod 24, threaded at each end, extends through the aperture within the octagonal structure 14 and is threaded into the threaded frustum 20. This rod 24 then passes through the unthreaded frustum 22, through an aperture 26 in a hydraulic or pneumatic cylinder 30 and is threaded within a piston 35 having a sealing ring 33 within the cylinder 30. When pressure is applied to a hydraulic piston 35 from a fluid pressure source 37 having a valve for controlling the application within the and release of the fluid pressure within the cylinder 30, the piston is forced to the end 31 of cylinder 30, simultaneously drawing frustum 20 toward frustum 22. The frustums 20 and 22 are thereby forced against respective concave and portions 19 and 21, by the release of pressure and subsequent movement of piston 28 and shift into the octagonal structure 14. When this occurs, the wedge-like members are forced radially outward and apart from each other, rapidly increasing the diameter of the structure 14. When the hydraulic pressure is quickly released, the octagonal structure quickly returns to its original diameter under the influence of the pressure build-up in the piston 31 between the ring 33 and the end wall of piston 31, and elastic bands 18 as the frustums are forced back to their original positions.

Thus it may be seen that the invention is intended to function as follows. When one wishes to insert a coupling within the end of a length of hose or tubing, the invention is first inserted into the end of the hose and, using either the hydraulic or pneumatic cylinder as a means for forcing the frustums toward each other, the hose is stretched by relatively quickly expanding the octagonal structure. After a short period of time, the unit is rapidly collapsed and removed from the hose or tubing and the coupling is quickly inserted therein before the hose or tubing has time to recover its original diameter. As the hose or tubing recovers to its original diameter, it forms a tight compression fitting with the coupling.

The expansion mechanism 10 can be provided in a plurality of different sizes to generally correspond with different sized hoses. Generally, the diameter of the elongate member 14 should be about ⅝ inches smaller than the inside diameter of the hose to be fitted. Therefore, the general diameter of the elongate structure 14 1⅜ inches when fitting a 2 inch hose with a coupling. However, it has been found that elongate structures 14 having diameter more than ⅝ inch smaller than the inside diameter of the hose to be fitted also function properly.

What is claimed is:

1. A method of securely coupling a flexible hose to a hose coupling comprising:

a) inserting an expansion mechanism into an unexpanded end of the hose, said expansion mechanism comprising:

1) a plurality of elongate wedges fitted together to form an elongate structure having a first concave end, 2) a first frustum positioned within said first concave end, and 3) mechanism for forcing said first frustum into and against said first concave end such that said elongate wedges are forced radially apart;

b) initiating said forcing mechanism for rapidly forcing the elongate wedges to shift radially outwardly until the hose becomes expanded;

c) quickly releasing said forcing mechanism such that the expansion mechanism generally collapses, and removing the expansion mechanism from the expanded hose;

d) positioning the coupling within the expanded hose before the expanded hose contracts toward its original diameter; and e) maintaining said coupling within the expanded hose until the expanded hose has contracted to form a generally tight fit against the coupling.

2. The invention in accordance with claim 1, wherein said coupling is slightly larger in diameter than the inside diameter of the hose before expansion.

3. The invention in accordance with claim 1, wherein said expansion member further includes a second concave end in the elongate member, a second frustum in abutment with the second concave end, said forcing mechanism rapidly forcing said elongate wedges radially apart from each other.

4. The invention in accordance with claim 1, wherein said forcing mechanism further comprises an elongate rod engaged within the first frustum and a fluid piston mechanism.

* * * * *